UNITED STATES PATENT OFFICE.

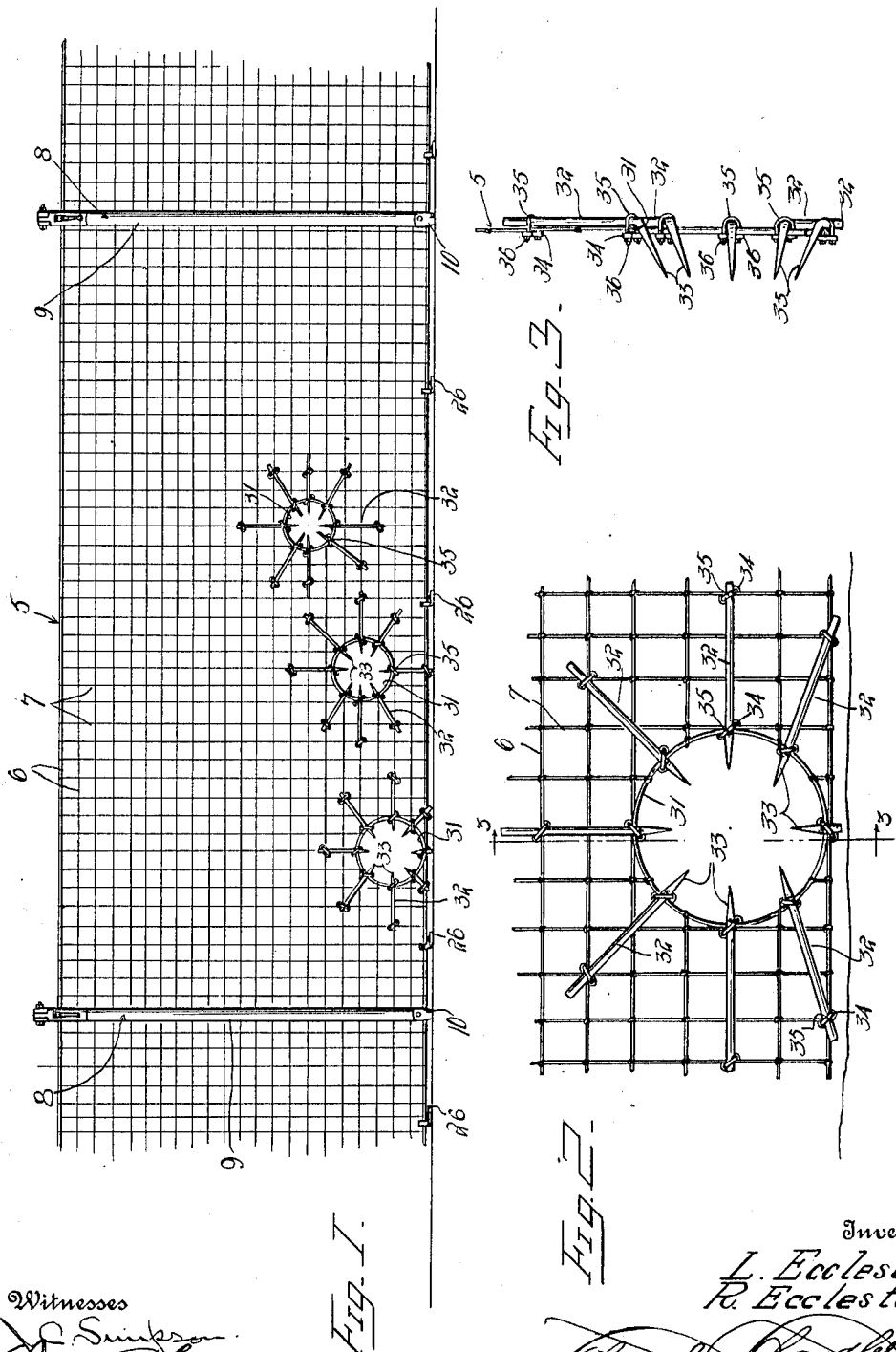

LEE ECCLESTON AND ROSS ECCLESTON, OF GREGSON, MONTANA.

TRAP.

1,020,029.      Specification of Letters Patent.     Patented Mar. 12, 1912.

Application filed April 6, 1911. Serial No. 619,365.

*To all whom it may concern:*

Be it known that we, LEE ECCLESTON and ROSS ECCLESTON, citizens of the United States, residing at Gregson, in the county of Silverbow, State of Montana, have invented certain new and useful Improvements in Traps; and we do hereby declare the following to be a full, clear, and exact description of the invention, such as will enable others skilled in the art to which it appertains to make and use the same.

This invention relates to an improvement in portable traps, especially designed for use in catching animals such as wolves and coyotes.

The principal object of the invention is to provide a device of the character described which is adapted to form an inclosure for trapping animals therein.

Another object of the invention is to provide a portable wire fence of novel construction which is adapted to form a closure as above mentioned.

Another object of the invention is to provide a portable fence for the purpose described having means associated therewith for impaling animals therein.

A still further object of the invention is to provide a device of the character described which is extremely simple in construction, is durable, and is cheap to manufacture.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawings:—Figure 1 is a side elevation showing a portion of a fence constructed in accordance with our invention and showing the trap associated therewith. Fig. 2 is an enlarged view of a portion of a fence showing a trap connected therewith. Fig. 3 is a horizontal sectional view taken on the line 3—3 of Fig. 2 in the direction indicated by the arrows.

Like reference numerals indicate corresponding parts throughout the several views.

Referring to the drawings 5 designates a woven wire fence which is composed of longitudinal strands 6 and vertical stays 7. This fence is adapted to be positioned in any place desired, and is supported in its proper position on the ground by standards, indicated as a whole by the numeral 8. These standards are spaced suitable distances apart, and each standard consists of separable legs 9—9 which are provided at their lower ends with pointed feet 10, which are adapted to penetrate the ground. In order to prevent animals from forcing their way under the bottom of the fence, there is provided a plurality of ground anchors 26 for engagement with the lower strand of the fence and hold it close to the ground.

A number of openings are cut in the fence and these openings are preferably disposed near the bottom portion of the fence and in staggered relation with respect to the said bottom. Within each opening and secured to the strands 6 and stays 7 of the fence are circular wire rings 31. Associated with the fence contiguous to the said openings are spikes 32 having one end 33 sharpened and disposed at an angle to the major portion thereof. The spikes are arranged around the opening in such a manner that the sharpened ends 33 project through the opening and forwardly therebeyond. In order to secure the said spikes to the fence we have provided a clamp which consists of a plate 34 and a substantially U-shaped bar 35, the ends thereof passing through the suitable apertures in the ends of the plate. The plate 34 is arranged on the side of the fence opposite the spike 32 and the bar 35 encircles the spike and either a strand or a spike of the fence and is secured in position by means of nuts 36. It may be found desirable to position these clamps to engage both a strand and a stay, this, however, being optional with the maker. A sufficient number of clamps are employed with each spike to firmly hold the latter in their proper position.

It will be observed that animals can easily pass through the openings and into the inclosure, but the position of the spikes will prevent them from passing out.

What is claimed is:—

The combination with a mesh wire fence including longitudinal strands and vertical stays and having an enlarged opening formed therein, of a circular wire ring disposed within the opening and secured to the strands and stays of the fence, impaling spikes having their major portions disposed against the fence and each having one end sharpened and disposed at an angle and projecting through said opening, means for securing the major portions of the spikes to the strands and stays of the fence, and separate means for securing the spikes to the ring.

In testimony whereof, we affix our signatures, in presence of two witnesses.

LEE ECCLESTON.
ROSS ECCLESTON.

Witnesses:
W. C. McCleery,
L. A. Storrar.

Copies of this patent may be obtained for five cents each, by addressing the "Commissioner of Patents, Washington, D. C."